United States Patent [19]

Dudley et al.

[11] 4,178,612
[45] Dec. 11, 1979

[54] DELTA FRAME CIRCUIT

[75] Inventors: Dana Dudley, Dallas; William M. Knight, Jr., Plano, both of Tex.

[73] Assignee: Texas Instruments Incorporated, Dallas, Tex.

[21] Appl. No.: 926,991

[22] Filed: Jul. 21, 1978

[51] Int. Cl.² .................. H04N 5/21; H04N 5/30
[52] U.S. Cl. ................................................ 358/167
[58] Field of Search ............. 358/160, 166, 167, 213, 358/905

[56] References Cited

U.S. PATENT DOCUMENTS

| | | | |
|---|---|---|---|
| 3,946,151 | 3/1976 | Kamiyama et al. | 358/167X |
| 4,058,836 | 11/1977 | Drewery | 358/167 |
| 4,107,736 | 8/1978 | Lowry et al. | 358/167 X |

Primary Examiner—Robert L. Richardson
Attorney, Agent, or Firm—Rene' Grossman; James T. Comfort; Alva H. Bandy

[57] ABSTRACT

A delta frame circuit is disclosed. The delta frame circuit is connected to the video output of, for example, an imaging system for the purpose of producing a moving target indication radar or, for example, a chopped imaging system for the purpose of removing fixed pattern or undesirable offset voltages. The delta frame circuit comprises a plurality of capacitors having top plates connected to the video output and lower plates connected to the drains of a first plurality of field effect transistors. The gates and sources of these field effect transistors are connected, respectively, to a Y address circuit and drains of a second plurality of field effect transistors. The gates and sources of these field effect transistors are connected, respectively, to a X address circuit and to the drains of a third plurality of field effect transistors whose gates and sources are connected, respectively, to the Y address circuit, and junction of a precharge reference voltage and output amplifier. The X and Y address circuits address the capacitors which store the video output of a field pixel by pixel for comparison to a reference voltage and a second video field whereby the offset signals are substantially removed.

12 Claims, 3 Drawing Figures

DELTA FRAME CIRCUIT

This invention relates to low signal detectors, and more particularly, to a low signal detector having a difference (delta frame) circuit for eliminating substantial offset (fixed pattern noise) noise signals from low amplitude signals.

In the past, devices such as, for example, infrared detection matrices used to produce signals representative of the infrared energy emanating from a scene are limited by the circuit offset (fixed pattern noise) noise signals which make it all but impossible to distinguish the desired train of low amplitude signals. If no fixed pattern noise were present it would be possible to detect signals to within the theoretical random noise limit of the detection element. In matrix detection units, the theoretical random noise limit cannot be achieved in practice as the fixed pattern noise is always present and it is amplified along with the video signal.

Accordingly, it is an object of the invention to provide low amplitude signals substantially free of offset (fixed pattern noise) voltages.

Another object of the invention is to provide a circuit for connection to the video outputs of a detector matrix for cancelling any signals which does not vary from frame to frame and hence provide a representation of moving targets.

Briefly stated the invention comprises a delta frame device connected to the video output of, for example, an infrared detection matrix. The delta-frame device compares a first field of video signals with a second field of video signals in a manner hereinafter described in detail to obtain a difference voltage free of offset (fixed pattern noise) voltages.

The novel features characteristic of the embodiment of the invention may best be understood by reference to the following detailed description when read in conjunction with the accompanying drawings, wherein.

Figure 1:
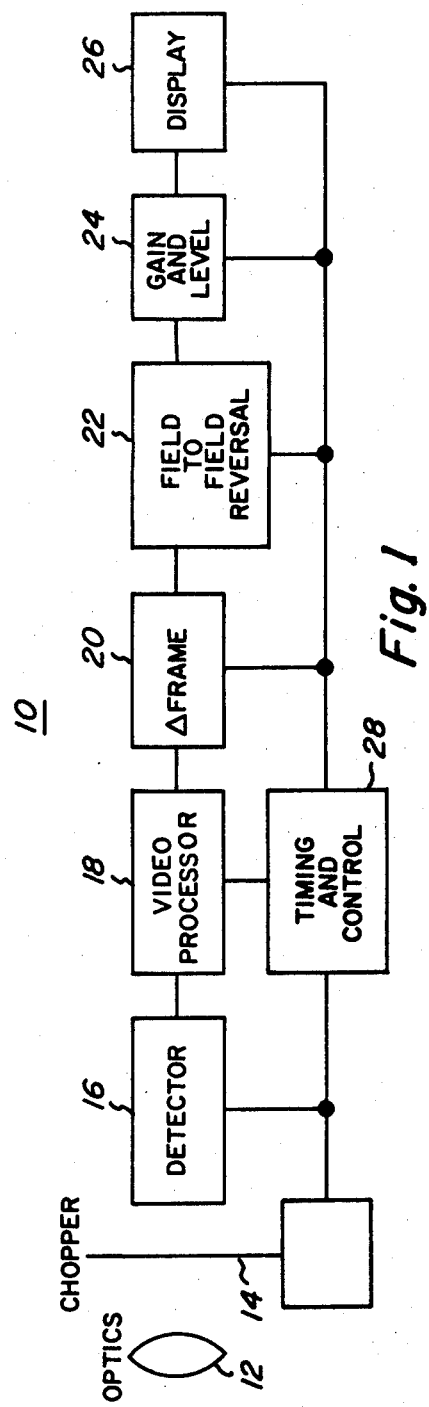
FIG. 1 is a block diagram showing the incorporation of the delta frame device in an infrared imaging system.

Referring now to FIG. 1 in which is shown for description purposes only and not by way of limitation an a.c. type infrared detector system 10 having incorporated therein the delta frame device. The infrared system 10 comprises an optical system 12, chopper 14, detector 16, video processor 18, delta frame device 20, field to field reversal means 22, gain and level means 24, display 26, and timer and controller 28. The optical system 12 is a combination of lens for focusing infrared energy emanating from a scene. The chopper 14 is a mechanical chopper for interrupting the focused infrared energy to provide intermittent signals for an a.c. infrared imager system. The detector 16, which may be, for example, an array of mercury-cadmium-telluride detector elements, receives the chopped, focused infrared energy and produces electrical signals representative of the scene. The video processor 18 is connected to the detector's output for processing the electrical signals into a display format such as, for example, a TV format. Those persons desiring a detailed description of the optical system, chopper, detector array, and video processor are referred to U.S. Pat. No. 3,742,238 issued June 26, 1973 to Richard G. Hoffman, II. The delta frame device 20 is connected to the video processor output for substantially eliminating offset (fixed pattern noise) voltages from the display signals. The field to field reversal means 22 is connected to the output of the delta frame output for alternately reversing the polarity of the delta frame device video line outputs to make the outputs thereof have the proper polarity for display. The gain and level means 24 is connected to the field to field reversal means to control the contrast of the display signals and to restore d.c. level. The display 26 is connected to the gain and level mean's output for displaying the image of the scene. Finally the timer and controller is connected to the chopper, detector, video processor, delta frame device, field to field reversal means, gain and level means, and display for synchronizing and controlling the operation of the delta frame device 20 and its associated elements (video processor, field to field reversal means, gain and level means, and display) with the chopper action.

Figure 2:
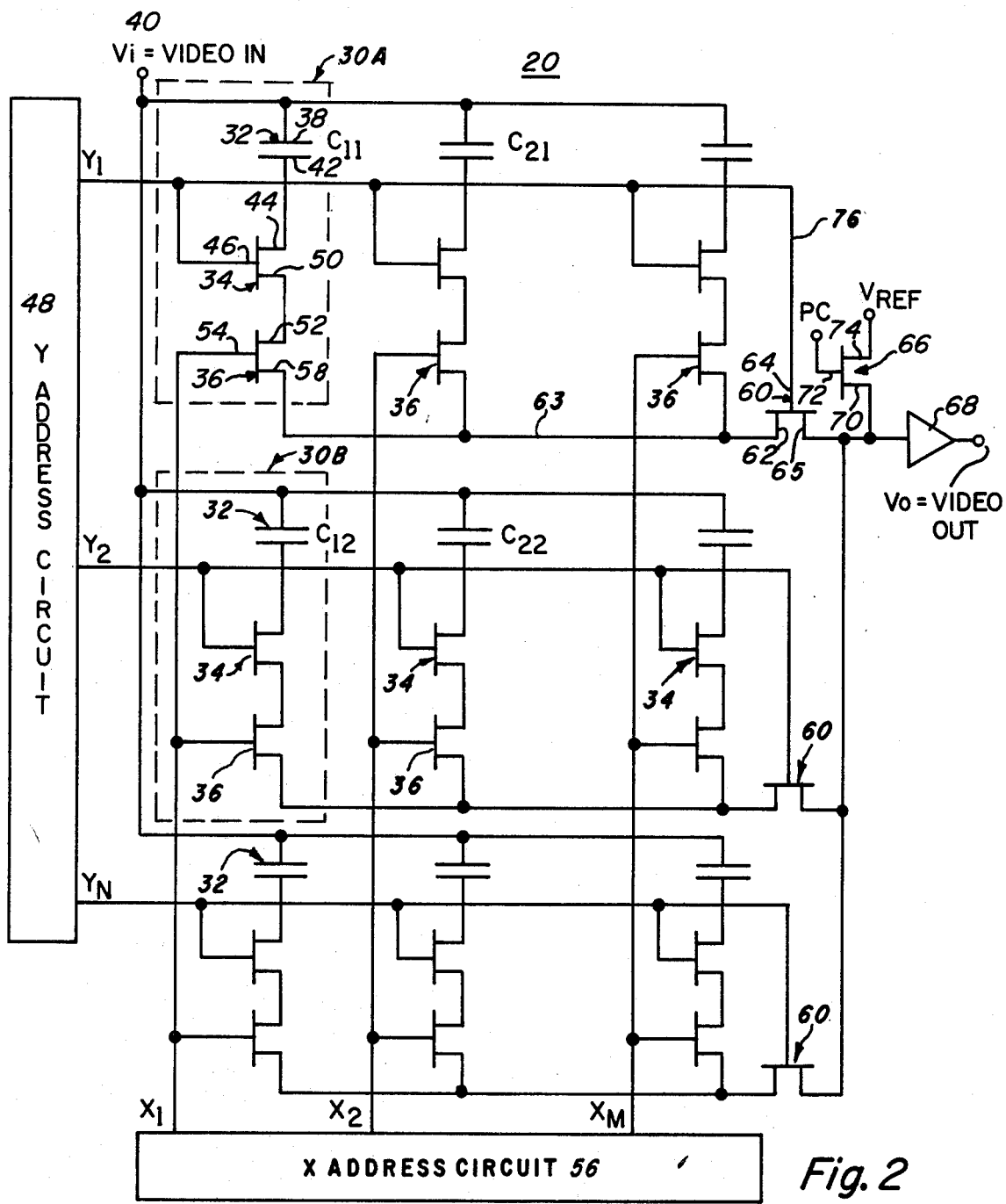
FIG. 2 is a view partly schematic of the delta frame device.

The delta frame device 20 (FIG. 2) is shown for its simplest mode of operation. It is organized to process the video signals of a picture element matrix in the sequence in which the video signals are generated. That is, for a TV format the delta frame device is constructed to process the video signals line by line and field by field; that is, an element of an array video signal processing elements is provided for each pixel and the elements are arranged in rows and columns as shown in FIG. 2.

Each element 30A, B, etc., comprises a capacitor 32 and two switches 34 and 36. The switches 34 and 36 may be, for example, metal oxide semiconductor field effect transistors. The capacitor 32 has its top plate 38 connected to the video input terminal 40 and its lower plate 42 connected to the drain 44 of switch 34. The gate 46 of switch 34 is connected to row line $Y_1$ of address register 48, and the source 50 of switch 34 is connected to the drain 52 of switch 36. The gate 54 of switch 36 is connected to the column line $X_1$ of X address register 56, and the source 58 of switch 36 is connected to a third or multiplexer switch 60.

The third or multiplexer switch 60 may be, for example, a MOSFET, and is one of a column of MOSFET switches having their drains 62 connected in common to the sources 58 of a row of second switches 36, their gates 64 connected to the $Y_1$–$Y_n$ address lines 76 of the Y address register 48, and their sources 65 connected in common to the junction of a voltage reference switch 66 and a video output amplifier 68. The voltage reference switch 66 has its gate 72 connected to the timer and controller 28, its drain 74 connected to a reference voltage source, and its source 70 connected to the junction of multiplexer switch 66 and video output amplifier 68.

With the elements 30 arranged in rows and columns and each element connected as described the gates 46 of switches 34 of each row of elements 30 and the gate 64 of multiplexer switch 60 are connected to a row address line of $Y_1$–$Y_n$ address lines of the Y address register 48, and the gates 54 of switches 36 of each column of elements 30 are connected to a column address line of $X_1$–$X_m$ address lines of the X address register 56. The Y and X address registers 48 and 56 and the gate 72 of the voltage reference switch 66 are connected to the timer and controller 28 (FIG. 1). The timer and controller 28 controls the operation of the delta frame 20 as will be hereinafter described.

The above described delta frame 20 preferably is a solid state device with each of the MOSFET switches 34, 36, 60 and 66 (FIG. 2) fabricated using standard state-of-the-art semiconductor fabrication techniques. As these techniques are well known to those skilled in the art they need not be described herein. Those seeking further information are referred to U.S. Pat. No. 3,921,282 issued Nov. 25, 1975 to James A. Cunningham et al. "Insulated Gate Field Effect Transistor Circuits and Their Method of Fabrication."

In operation, the infrared detection system 10 (FIG. 1) is directed toward a scene and the optical system 12 focuses the infrared energy of the scene. The chopper 16 is, for example, a mechanical chopper having shuttered apertures. Thus, the chopper alternately admits and blocks the passage of the focused infrared energy to the detector 16 where it is converted into a.c. signals representative of the energy's intensity. The video processor 18 processes the electrical signals into a desired format, such as, for example, a TV format, i.e., prepare the electrical signals for a desired number of scanning lines per frame period. The electrical (video) signals are connected to the video input terminal 40 (FIG. 2) of the delta frame device 20. The delta frame device 20 (FIG. 1) is controlled by the timer and controller 28 which is synchronized to the chopper operation, i.e., its count coincides with the chopper rate to produce a count pulse each time the chopper opens and closes to produce light pulses. Thus, during the time the first line of video signals are produced for field 1, the X address register 56 (FIG. 2) is actuated by the timer and controller 28 (FIG. 1) to set address lead $X_1$ in a high (1) state and the remaining $X_2$–$X_m$ lines in a low (0) state to enable the transistor switches 36 of the $X_1$ line and to disable the transistor switches 36 of the remaining $X_2$–$X_m$ address lines. At the first pixel of the video, the timer and controller 28 (FIG. 1) pulses the Y address circuit 48 (FIG. 2) to set address lead $Y_1$ in a high (1) state and the remaining $Y_2$–$Y_n$ address leads in a low (0) state to enable the transistor switches 34 and multiplexer switch 60 of the $Y_1$ line and to disable the transistor switches 34 and multiplexer transistor switches 60 of the $Y_2$–$Y_n$ address leads. Thus, the element 30A will be connected to the voltage reference switch 66 and video output amplifier 68 at the time the first pixel signal is received; all other elements are isolated. The first pixel signal, therefore is applied to the top plate 38 of the capacitor 32 of the element 30A to charge it to its value. Then, before the next pixel time in the video, the timer and controller 28 pulses the reference voltage switch "on" and then "off" through its precharge line to apply a reference voltage to the lower plate 42 of capacitor 32 to store a charge in the capacitor of the following magnitude:

$$Q_{30A}(\text{field 1}) = C_{30A}[V_{REF} - [V_{30A}(\text{scene}) + V_{30A}(\text{offset})]] \quad (\text{field 1}) \quad (1)$$

At the time of the next pixel the Y address register applies a low (0) state voltage to address leads $Y_1$ and $Y_3$–$Y_n$ and a high (1) state voltage to address lead $Y_2$ to connect element 30B to the reference voltage switch 66 and video output amplifier 68; while, isolating the remaining elements. Thus, the second pixel voltage in the video is applied to the upper plate of capacitor 32 of element 30B. Then, before the next pixel in the video, the voltage reference transitor switch is turned on and off by the precharge pulse to apply the reference voltage to the lower plate of the capacitor 32 of element 30B to charge it to the following magnitude:

$$Q_{30B}(\text{field 1}) = C_{30B}[V_{REF} - [V_{30B}(\text{scene}) + V_{30B}(\text{offset})]] \quad (\text{field 1})$$

This process is repeated until all the capacitors 32 in the $X_1$ column have been set. Then the X address register sends a low (0) state voltage to address leads $X_1$ and $X_3$–$X_m$ and a high (1) state voltage to address lead $X_2$ and the process repeated until all the capacitors in the $X_2$ column have been set. Then the process is repeated until all the capacitors have been set to their appropriate value for the first field of video.

Figure 3:
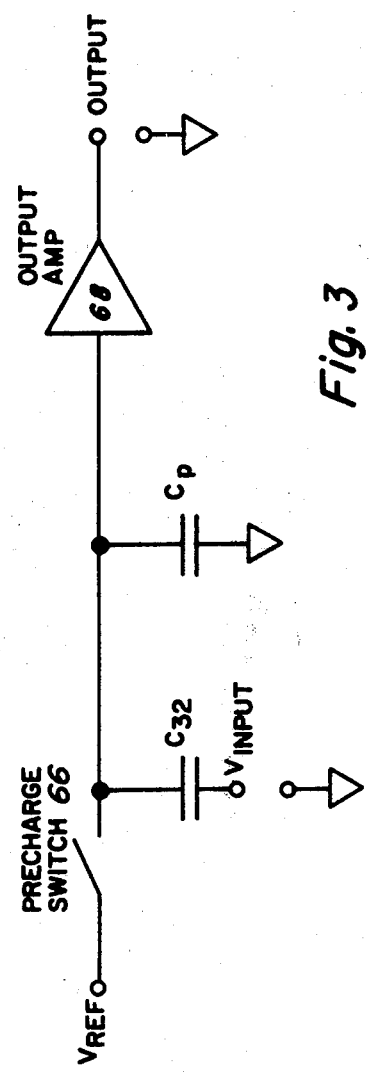
FIG. 3 is an electrical equivalent circuit for a single element of the delta frame device.

The delta frame process is then repeated on the next field which is produced during the time the chopper is closed and thereafter on alternate fields of video. For the next field (field 2), when the first pixel in the blanked (chopper closed) video is applied to element 30A the output amplifier 68 sees the equivalent circuit shown in FIG. 3. The capacitance $C_p$ is the parasitic capacitance resulting from the sense line 63, output line 70, (FIG. 2) and other fabrication elements. As $C_p$ was precharged to $V_{REF}$ it contains a charge as follows:

$$Q_p = C_p V_{REF} \quad (2)$$

The charge stored on the element 30A capacitor 32 (FIG. 3) in the previous field (field 1) was $Q_{30A} = C_{30A}[V_{REF} - [V_{30A}(\text{scene}) + V_{30A}(\text{offset})]]$(field 1). This charge together with the charge $Q_p$ will redistribute to form a new voltage on the input to the output amplifier. Thus, $$Q_p + Q_{30A}(\text{field 1}) = C_p V_\mu + C_{30A}[V_\mu - [V_{30A}(\text{chopper}) + V_{30A}(\text{offset})]](\text{Field 2}) \quad (3)$$

Where $V_\mu$ is the equilibrium voltage.

$$(C_p + C_{30A})V_\mu = [C_p V_{REF} + C_{30A} V_{REF}] - C_{30A}[V_{30A}(\text{scene}) + V_{30A}(\text{offset}) - [(V_{30A}(\text{chopper}) + V_{30A}(\text{offset})]] \quad (4)$$

or $$V_\mu = V_{REF} - \frac{C_{30A}}{C_p + C_{30A}} [V_{30A}(\text{scene}) + V_{30A}(\text{offset}) - [V_{30A}(\text{chopper}) + V_{30A}(\text{offset})]] \quad (5)$$

The output voltage of the output amplifier which has a gain of $A_o$ will change by:

$$\Delta V_{out}(\text{field 2}) = A_o(V_\mu - V_{REF}) = \frac{A_o C_{30A}}{C_p + C_{30A}} [V_{30A}(\text{chopper}) + V_{30A}(\text{offset}) - [V_{30A}(\text{scene}) + V_{30A}(\text{offset})]] \quad (6)$$

$$= \frac{A_o C_{30A}}{C_p + C_{30A}} [V_{30A}(\text{chopper}) - V_{30A}(\text{scene})].$$

Thus, $V_{out}$ is the delta frame information. Then when the precharge switch 66 (FIG. 2) is pulsed on and off the capacitor 32 (FIG. 3) of 30A is reset to the following charge:

$$Q_{30A} = C_{30A}[V_{REF} - [V_{30A}(\text{chopper}) + V_{30A}(\text{offset})]] \quad (7)$$

As the switching action continues through all the pixels of the field, a video line is produced that is the difference (delta, Δ) voltage of the two fields. On the next field (chopper open) the output voltage for the $V_{30A}$ pixel is:

$$\Delta V_{out}\text{ (field 3)} = \frac{A_o C_{30A}}{C_p + C_{30A}} [V_{30A}\text{ (scene)} + V_{30A} \tag{8}$$

$$\text{(offset)} - [V_{30A}\text{ (chopper)} + V_{30A}\text{ (offset)}]] = \frac{A_o C_{30A}}{C_p + C_{30A}}$$

$$[V_{30A}\text{ (scene)} - V_{30A}\text{ (chopper)}].$$

The process is then continued on in time for the successive fields to remove offset voltages from the video.

It will be appreciated by those skilled in the art that for nonchopping systems the V(chopper) of field 2 becomes a scene one field time later such that for successive fields the output voltage will be as follows:

$$\Delta V_{out} = A_o (V_\mu - V_{REF}) =$$
$$\frac{A_o C_{30A}}{C_p + C_{30A}} [V_{30A}\text{ (field 2)} - V_{30A}\text{ (field 1)}]$$

Hence, the output voltage of the device is a value representing the difference in signal for successive fields. This case is commonly referred to as a MTI sensor.

The field to field reversal circuit 22 (FIG. 1) is a standard circuit and not considered a part of the invention. Thus, a more detailed description is not given. The field to field circuit is necessary to change the polarity of either the even or odd numbered video fields it receives from the delta frame device to provide for consistent signal polarity on the display.

The gain and level circuits 24 are well known circuits and need not be described. The gain circuit is to reestablish the gain of video signals generated by the video processor 18 and to provide for contrast in the display 26. While the level circuit is to restore the d.c. component of the video signal after the a.c. amplification for the display 26.

The display 26 is a standard cathode ray tube or other display unit and need not be described in detail. The display is connected to the gain and level circuits for displaying the restored video signals.

Although only one embodiment of the invention has been described, it will be readily apparent to a person skilled in the art that various modifications to the details of construction shown and described may be made without departing from the scope of this invention.

What is claimed is:

1. A circuit for removing offset voltages from video signals comprising:
   (a) a plurality of capacitors having upper and lower plates, said plurality of capacitors arranged in rows and columns;
   (b) a video input line connected to the upper plates of the plurality of capacitors for charging the capacitors to the potentials of the incoming video signals;
   (c) a first plurality of metal oxide semiconductor field effect transistors having drain, gate, and source electrodes, said drain electrodes being connected to the lower plates of the capacitors;
   (d) a Y address circuit having a plurality of address leads connected to the gates of rows of the MOSFET's for selectively energizing rows of the first plurality of MOSFET's;
   (e) a second plurality of MOSFET's having drain, gate, and source electrodes, said drain electrodes connected to the source electrodes of the first plurality of MOSFET's;
   (f) an X address circuit having a plurality of address leads connected to gates of columns of the second plurality of MOSFET's for selectively energizing columns of the second plurality of MOSFET's; said X and Y address circuits and first and second plurality of MOSFET's operative to address by rows and columns the plurality of capacitors;
   (g) a multiplexer having a plurality of MOSFET's having drain, gate, and source electrodes, said drain electrodes connected to rows of the source electrodes of the second plurality of MOSFET's; and said gates connected to the address lines of the Y address circuit;
   (h) a precharge timer;
   (i) a reference voltage;
   (j) a MOSFET having drain, gate and source electrodes, said drain electrode connected to the reference voltage, said gate connected to the precharge timer, and said source electrode connected to the source electrodes of the multiplexer MOSFET's, said MOSFET switch operable selectively to apply a reference voltage through the multiplexer to the lower plate of a preselected capacitor; and
   (k) an output amplifier having its input terminal connected to the junction of the sources of the multiplexer MOSFET's and source of the precharge MOSFET for selectively amplifying video signals substantially free of any offset voltage for display.

2. A circuit for removing offset voltages from video signals comprising: X and Y address means, an array of difference frame elements having terminals for connection to a source of video signals, a multiplexer, a voltage reference switch having an input terminal for connection to a reference voltage source, and an output amplifier, said X and Y address means operatively connected to the array of difference frame elements and multiplexer to address sequentially each element of the array of difference frame elements and multiplexer for connecting sequentially each element to the video signal terminal and multiplexer, said multiplexer having input terminals for connecting each element of rows of difference frame elements sequentially to the reference voltage switch and to the output amplifier whereby offset voltages of succeeding video frames are cancelled from the video signals.

3. A circuit for removing offset voltages from video signals comprising:
   (a) a plurality of electrical signal storing means for storing video signals;
   (b) a first plurality of switches connected to the electrical storing means;
   (c) a second plurality of switches connected to the first plurality of switches;
   (d) a multiplexer including a third plurality of switches, said plurality of electrical signal storing means, and first and second plurality of switches being arranged in rows and columns with each row of the first plurality of switches having at one end one switch of the third plurality of switches of the multiplexer;
   (e) a first switch activating means connected to the rows of first plurality of switches and third plurality of switches of the multiplexer for selectively closing and opening said switches by rows;
   (f) a second switch activating means connected to the columns of the second plurality of switches for selectively activating by columns the second plurality of switches;

(g) a reference voltage means connected through the multiplexer, and first and second plurality of switches to the outputs of the plurality of electrical signal storing means; and (h) a controller connected to the first and second switch activating means, multiplexer, and reference voltage means for selectively controlling their operation whereby the plurality of electrical signal storing means selectively stores successive electrical signals and reference voltages in response to the selective operation of the first and second plurality of switches, multiplexer and reference voltage means to produce signals substantially free of offset voltages.

4. A circuit according to claim 3 wherein the plurality of electrical signal storing means is a plurality of capacitors having top plates connected to receive video signals including any offset voltages and lower plates connected to the first plurality of switches.

5. A circuit according to claim 3 wherein the first and second plurality of switches and the plurality of switches of the multiplexer are bidirectional transistor switches.

6. A circuit according to claim 3 wherein the first plurality of switches are metal oxide semiconductor field effect transistors having drain electrodes connected to the outputs of the first plurality of electrical signal storing means, gate electrodes connected to the first switch activating means and source electrodes connected to the second plurality of switches.

7. A circuit according to claim 3 wherein the second plurality of switches are metal oxide semiconductor field effect transistors having drain electrodes connected to the outputs of the first plurality of switches, gate electrodes connected to the second switch activating means and source electrodes connected to the multiplexer switches.

8. A circuit according to claim 3 wherein the plurality of switches of the multiplexer are metal oxide semiconductor field effect transistors having drain electrodes connected to the outputs of the second plurality of switches, gate electrodes connected to the first switch activating means, and source electrodes connected to the reference voltage means and display.

9. A circuit according to claim 3 wherein the first and second switch activating means are Y and X address registers, said Y address register operative to selectively address by rows the first plurality of switches and the plurality of switches of the multiplexer, and said X address register operative to selectively address by columns the second plurality of switches.

10. A circuit according to claim 3 wherein the reference voltage means comprises a metal oxide semiconductor field effect transistor having a drain electrode for connection to a reference voltage source, a gate electrode connected to the controller for receiving a precharge pulse and a source electrode connected to the plurality of switches of the multiplexer, said gate operative in response to a precharge pulse to connect the reference voltage to the plurality of switches of the multiplexer.

11. In a circuit for removing fixed pattern noise voltages from a desired signal an element comprising a capacitor having a top plate for connection to a source of desired signals and a lower plate, and first and second solid state bidirectional transistor switches having first electrodes, switch control electrodes, and second electrodes, said first switch having its first electrode connected to the lower plate of the capacitor, its switch control electrode having a terminal for connection to a first on/off biasing signal means, and its second electrode connected to the first electrode of the second transistor switch, said second transistor switch having a switch control electrode terminal for connection to a second on/off biasing signal means, and its second electrode for connection to an input/output terminal.

12. A method of removing offset voltages from video signals comprising:

(a) for a first frame:
  (i) sequentially energizing by columns a first plurality of switches at a first preselected rate, said first plurality of switches having input terminals connected to the outputs of a second plurality of switches and outputs connected to input terminals of a multiplexer;
  (ii) sequentially energizing by rows the second plurality of switches at a second preselected rate alternately with a plurality of reference voltage switches connected to a reference voltage, said second plurality of switches having input terminals connected to the outputs of a plurality of video signal storing elements and output terminals connected to switching terminals of the multiplexer and said reference voltage switches having output terminals connected to the output terminals of the multiplexer whereby when said rows of the second plurality of switches and reference voltage switch for each row are sequentially energized alternately during the sequentially energization of each column of said first plurality of switches a signal equal to the capacitance of each storage element multiplied by the reference voltage minus the video voltage plus the offset voltage is stored in each storage element of the plurality of storage elements for the first field of view; and (b) for a second frame, repeating the above steps whereby when the signal on each storage element of the plurality of storing elements is applied to an output amplifier an output voltage equal to the gain of the output amplifier multiplied by the capacitance of each storage element and the product divided by the parasitic capacitance plus the capacitance of the storage element and the result multiplied by the voltage of the first frame video signal minus the voltage of the second frame is produced and the offset voltages have been cancelled.

* * * * *